(12) United States Patent
Baghdasarian

(10) Patent No.: US 12,227,315 B2
(45) Date of Patent: Feb. 18, 2025

(54) SHOCKLESS SPACECRAFT DISPENSER

(71) Applicant: Maxar Space LLC, Westminster, CO (US)

(72) Inventor: Varouj Baghdasarian, Cupertino, CA (US)

(73) Assignee: Maxar Space LLC, Palo Alto, CA (US)

( * ) Notice: Subject to any disclaimer, the term of this patent is extended or adjusted under 35 U.S.C. 154(b) by 81 days.

(21) Appl. No.: 17/967,582

(22) Filed: Oct. 17, 2022

(65) Prior Publication Data
US 2024/0124166 A1 Apr. 18, 2024

(51) Int. Cl.
| | | |
|---|---|---|
| *B64G 1/64* | (2006.01) | |
| *F15B 15/14* | (2006.01) | |
| *F15B 15/20* | (2006.01) | |

(52) U.S. Cl.
CPC .......... *B64G 1/645* (2013.01); *F15B 15/1447* (2013.01); *F15B 15/204* (2013.01); *B64G 1/643* (2023.08)

(58) Field of Classification Search
CPC ........ B64G 1/643; B64G 1/644; B64G 1/641; B64G 1/6459
See application file for complete search history.

(56) References Cited

U.S. PATENT DOCUMENTS

| | | | |
|---|---|---|---|
| 5,058,385 A * | 10/1991 | Everett, Jr. | ........... F15B 11/076 60/591 |
| 6,119,984 A | 9/2000 | Devine | |
| 6,311,930 B1 | 11/2001 | Hersh et al. | |
| 9,567,109 B2 | 2/2017 | Robles et al. | |
| 10,479,534 B1 | 11/2019 | Baghdasarian et al. | |
| 10,538,348 B2 | 1/2020 | Riskas | |
| 10,717,551 B2 | 7/2020 | Estevez et al. | |
| 11,787,572 B1 * | 10/2023 | Thompson | ............. B64G 1/641 244/173.3 |
| 2015/0353211 A1 | 12/2015 | London et al. | |
| 2020/0270001 A1 | 8/2020 | Mansour et al. | |
| 2022/0033111 A1 | 2/2022 | Welle | |
| 2022/0135258 A1 | 5/2022 | Admani et al. | |

FOREIGN PATENT DOCUMENTS

| | | | |
|---|---|---|---|
| CN | 103963999 A * | 8/2014 | |
| EP | 0657352 A1 * | 6/1995 | |
| EP | 2213572 A1 | 8/2010 | |

* cited by examiner

*Primary Examiner* — Philip J Bonzell
*Assistant Examiner* — Eric Acosta
(74) *Attorney, Agent, or Firm* — Pearl Cohen Zedek Latzer Baratz LLP

(57) ABSTRACT

Technology is disclosed herein for preventing or at least significantly reducing shock to spacecraft such as satellites when releasing a hold-down rod assembly that clamps the spacecraft to, for example, a launch vehicle adaptor. The hold-down rod assembly has tension rods that may be pre-loaded at considerable tension in order to hold down a stack of spacecraft in a launch configuration. In an embodiment, pneumatic actuators are used to slowly release the tension in the tension rods. Therefore, shock to the spacecraft is prevented or at least significantly reduced.

15 Claims, 13 Drawing Sheets

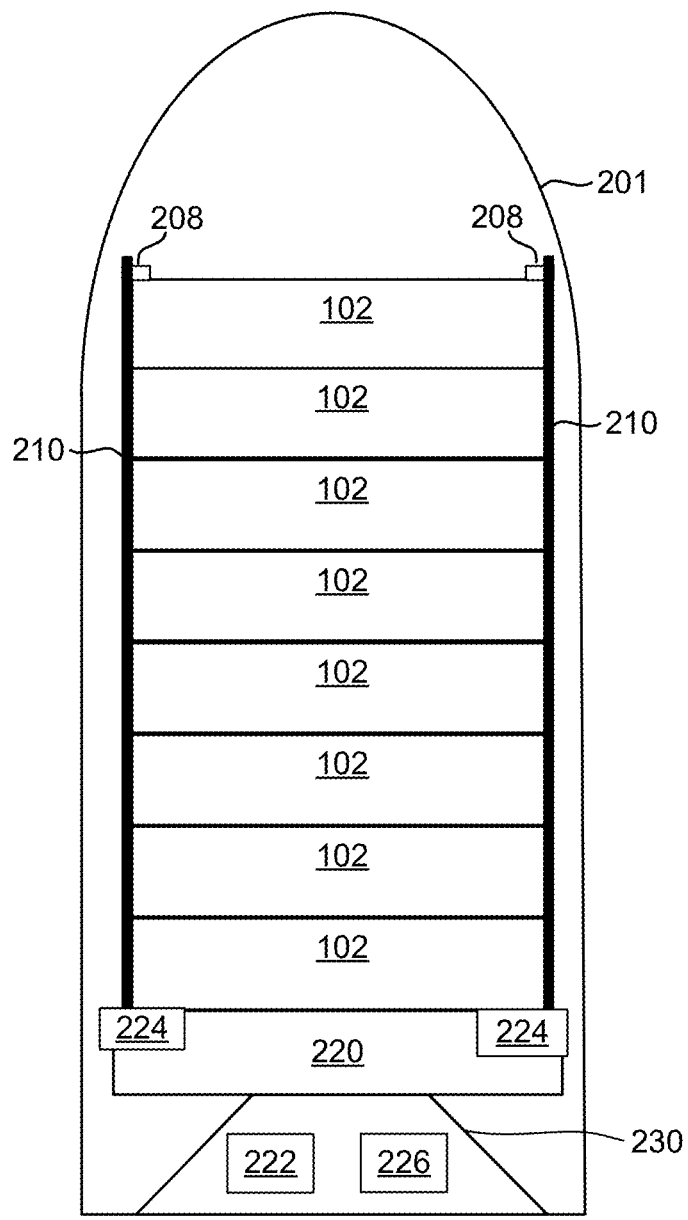
Figure 2

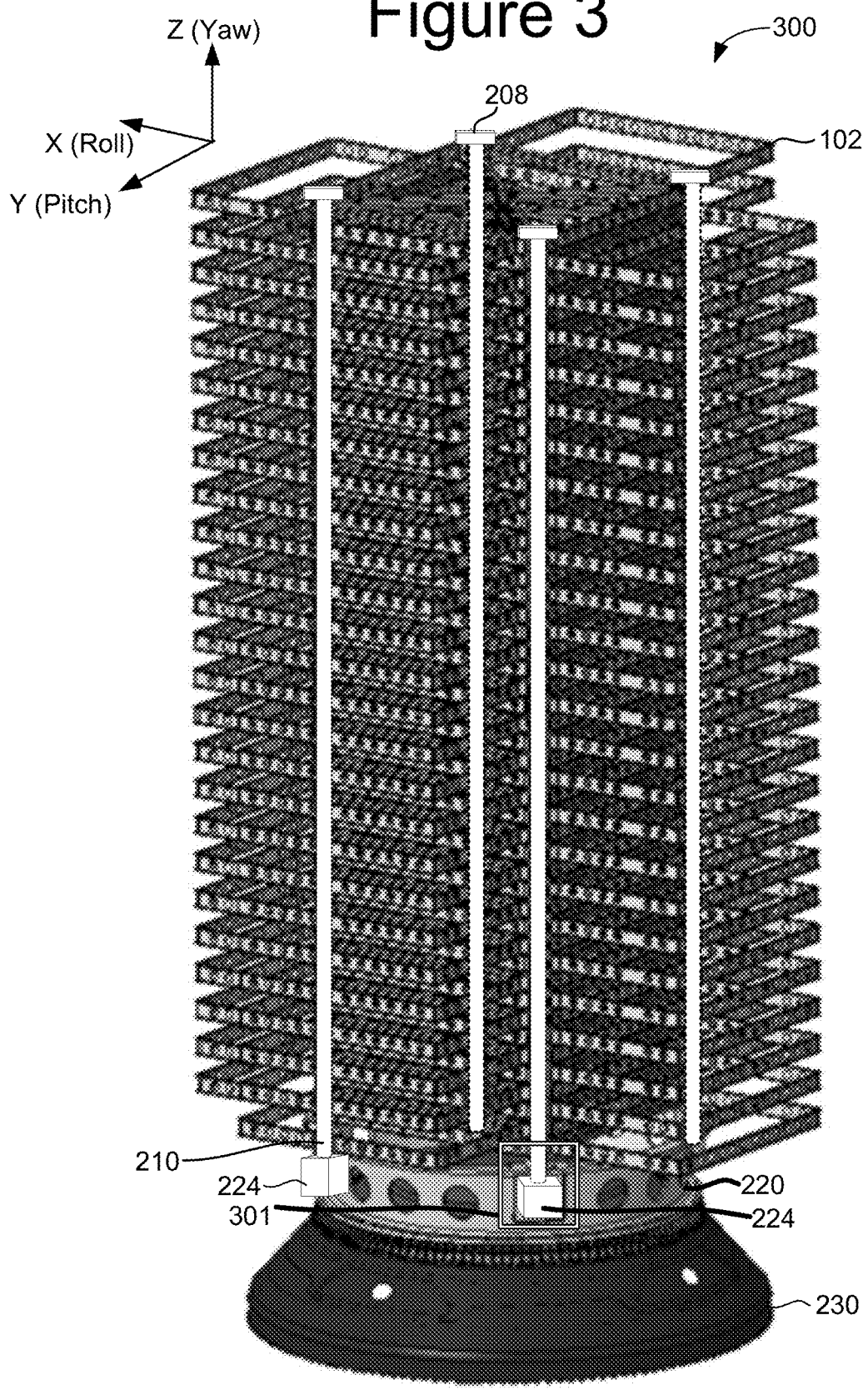

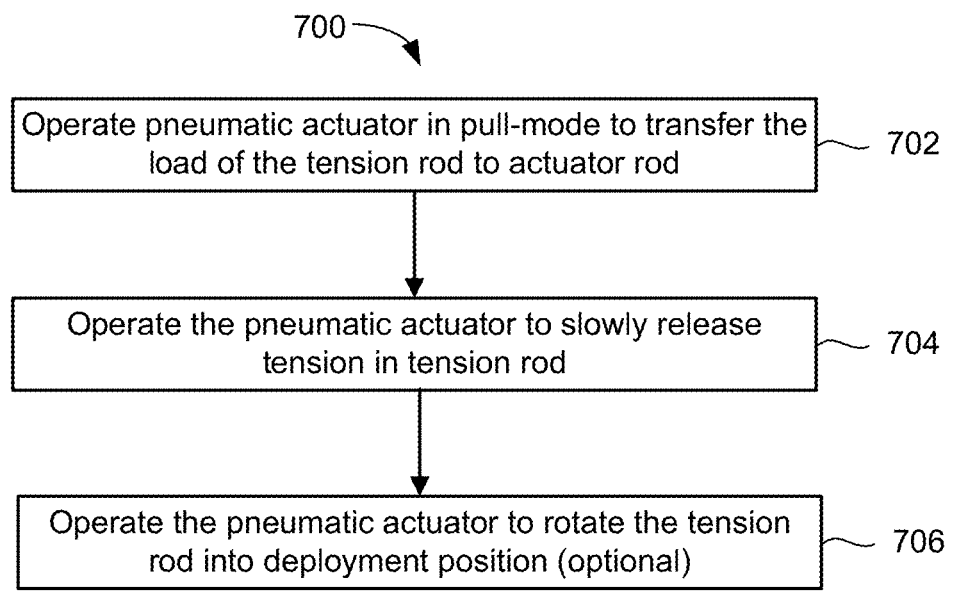

SHOCKLESS SPACECRAFT DISPENSER

BACKGROUND

The cost to launch spacecraft such as satellites into orbit is extraordinarily expensive. The cost per spacecraft can be reduced by launching multiple spacecraft with one launch vehicle. A tie-down and release mechanism may be used to hold the multiple spacecraft to the launch vehicle, typically by holding the spacecraft to a launch vehicle adaptor. The tie-down and release mechanism may also be referred to as a launch restraint and dispensing structure. Once in orbit, the spacecraft may be dispensed from the tie-down and release mechanism.

The tie-down and release mechanism may have hold-down rods or the like that clamp the spacecraft to the launch vehicle adaptor. The hold-down rods are highly tensioned and may also be referred to as tension rods. In order to dispense (or deploy) the spacecraft the hold-down rods are released such that they no longer clamp down the stack of spacecraft. However, releasing the highly-tensioned hold-down rods can create an unacceptable shock that could damage the spacecraft flight hardware.

BRIEF DESCRIPTION OF THE DRAWINGS

FIG. 2 an embodiment of a launch configuration for a spacecraft within a fairing of a launch vehicle.

FIG. 3 depicts a perspective view of a stack of spacecraft in a launch configuration.

FIG. 7 is a flowchart of one embodiment of a process of a controlled release of tension in a highly tensioned hold-down rod assembly.

DETAILED DESCRIPTION

Technology is disclosed herein for preventing or at least significantly reducing shock to spacecraft such as satellites when releasing a hold-down rod assembly that clamps the spacecraft to, for example, a launch vehicle adaptor. The hold-down rod assembly has tension rods that may be pre-loaded at considerable tension in order to hold down a stack of spacecraft in a launch configuration. In an embodiment, pneumatic actuators are used to slowly release the tension in the tension rods. Therefore, shock to the spacecraft is prevented or at least significantly reduced.

Figure 1:
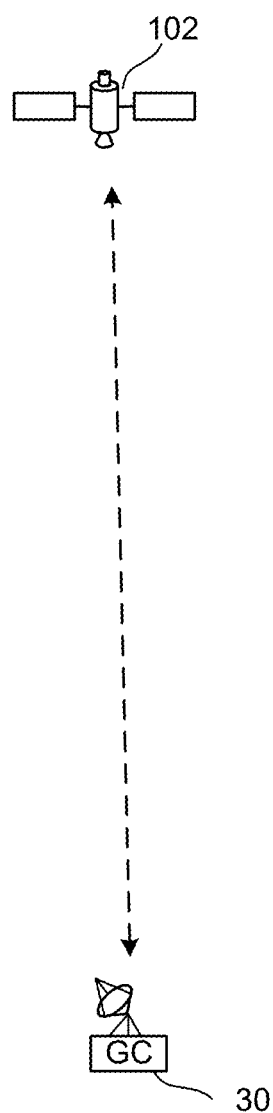
FIG. 1 is a block diagram of a spacecraft system.

FIG. 1 is a block diagram of a spacecraft system. The system of FIG. 1 includes spacecraft 102 and ground control terminal 30. In one embodiment, spacecraft 102 is a satellite; however, spacecraft 102 can be other types of spacecrafts (e.g., shuttle, space station, inter-planet traveling craft, rocket, etc.). Spacecraft 102 may be located, for example, at a geostationary or non-geostationary orbital location. Spacecraft 102 can also be a Low Earth Orbit satellite. Technology disclosed herein may be used for deploying spacecraft such as spacecraft 102 into orbit. In an embodiment, multiple spacecraft are deployed into orbit using a single launch vehicle. One embodiment includes a pneumatic actuator system that slowly releases tension in a hold-down rod assembly to prevent or at least significantly reduce shock to the multiple spacecraft.

Ground control terminal 30 is used to monitor and control operations of spacecraft 102. In some embodiments, the ground control terminal 30 may monitor and control operations of a launch vehicle that dispenses the spacecraft 102. Spacecraft can vary greatly in size, structure, usage, and power requirements. In one embodiment, the spacecraft 102 is used as a communication satellite. In some embodiments, the spacecraft 102 has other payloads such as for an optical satellite.

FIG. 2 illustrates an embodiment of a stack of spacecraft 102 in a launch configuration within a fairing 201 of a launch vehicle (launch vehicle not illustrated). The configuration in FIG. 2 may be referred to as a launch configuration. The launch configuration includes a launch adaptor 220 that is mechanically coupled, in the launch configuration, with a primary payload adaptor 230 that may be part of an upper stage (not illustrated) of the launch vehicle. Together the launch adaptor 220 and the primary payload adaptor 230 may be referred to herein as a launch vehicle adaptor. The launch adaptor 220 may also be referred to as payload adaptor faring. In general, the adaptors 220, 230 are used to help carry the load from the multiple spacecraft 102 to the launch vehicle. The adaptors 220, 230 may be formed from a lightweight material such as aluminum, titanium, or graphite.

The stack of spacecraft 102 are held together in the launch configuration by a hold-down rod assembly. In an embodiment, the hold-down rod assembly includes a number of hold-down rods 210 and clamp assemblies 208. Each clamp assembly 208 may have a bracket or the like that may be positioned on top of the stack of spacecraft 102 in order to allow the hold-down rod assembly to apply a downward force on the stack. Each clamp assembly 208 may have other elements such as springs, which may be pre-loaded in the launch configuration. The hold-down rod assembly secures the stack of spacecraft 102 to the launch adaptor 220. The hold-down rods 210 may be pre-loaded with considerable tension. As one example, the hold-down rods 210 may be pre-loaded at about 100,000 pounds of tension. The hold-down rods 210 may also be referred to as tension rods. The hold-down rods 210 could be formed from, for example, aluminum, titanium or graphite. While FIG. 2 depicts two tension rods 210 there could be more than two tension rods. In one embodiment, there are four tension rods 210. In one embodiment, there are six tension rods 210.

The hold-down rod assembly is part of a tie-down and release mechanism, which may also be referred to herein as a launch restraint and dispensing structure. The tie-down and release mechanism has pneumatic actuators 224 that are used to slowly release the tension in the hold-down rod assembly. A pneumatic actuator is a device that converts energy, typically in the form of compressed gas, into mechanical motion. Tank 226 provides a pressurized source of gas for use in the pneumatic actuators 224. In one embodiment Helium is used in the pneumatic actuators 224, but other gasses could be used. The tank 226 could be located elsewhere such as in the launch adaptor 220 or even in the launch vehicle itself. Gas lines that run between the tank 226 and the pneumatic actuators 224 are not depicted in FIG. 2. Prior to deploying the spacecraft 102, in one embodiment, the pneumatic actuators 224 move the tension rods 210 to a deployment configuration to allow the spacecraft 102 to be deployed.

In an embodiment, a control circuit 222 in the primary payload adaptor 230 controls the tie-down and release mechanism. For example, the control circuit 222 may control the pneumatic actuators 224 that are used to slowly release tension in the tension rods 210. The control circuit 222 may comprise hardware and/or software. The control circuit 222 could include one or more of a processor (e.g., micro-processor), PGA (Programmable Gate Array, FPGA (Field Programmable Gate Array), ASIC (Application Specific Integrated Circuit), integrated circuit or other type of circuit.

FIG. 3 depicts a perspective view of a stack of spacecraft 102 in a launch configuration. Only the sidewalls of the body (or bus) of each spacecraft 102 is depicted in FIG. 3. The spacecraft body has a planar rectangular shape in this example. However, the spacecraft body is not required to be planar. Moreover, the spacecraft body is not required to be rectangular. In the example depicted in FIG. 3, each spacecraft 102 is rotated 90 degrees in the x-y plane with respect to the spacecraft at the next level in the stack 300. The configuration in FIG. 3 may be referred to as a launch configuration. The launch configuration includes a launch adaptor 220 that is mechanically coupled, in the launch configuration, with a primary payload adaptor 230 that may be part of an upper stage (not illustrated) of the launch vehicle.

The stack 300 of spacecraft 102 are held together in the launch configuration by a hold-down rod assembly. In an embodiment, the hold-down rod assembly includes a number of hold-down rods 210 and tie-down clamp assemblies 208. The hold-down rod assembly secures the stack of spacecraft 102 to the launch adaptor 220. The hold-down rods 210 may be pre-loaded with considerable tension.

Figure 4A:
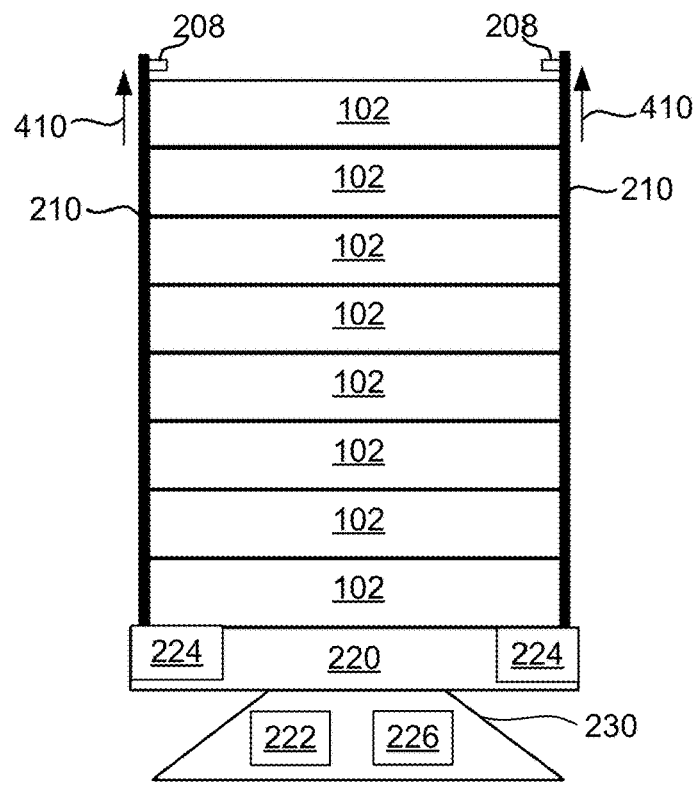
FIG. 4A depicts a stack of spacecraft after tension in the tension rods has been released by the pneumatic actuators.
Figure 4B:
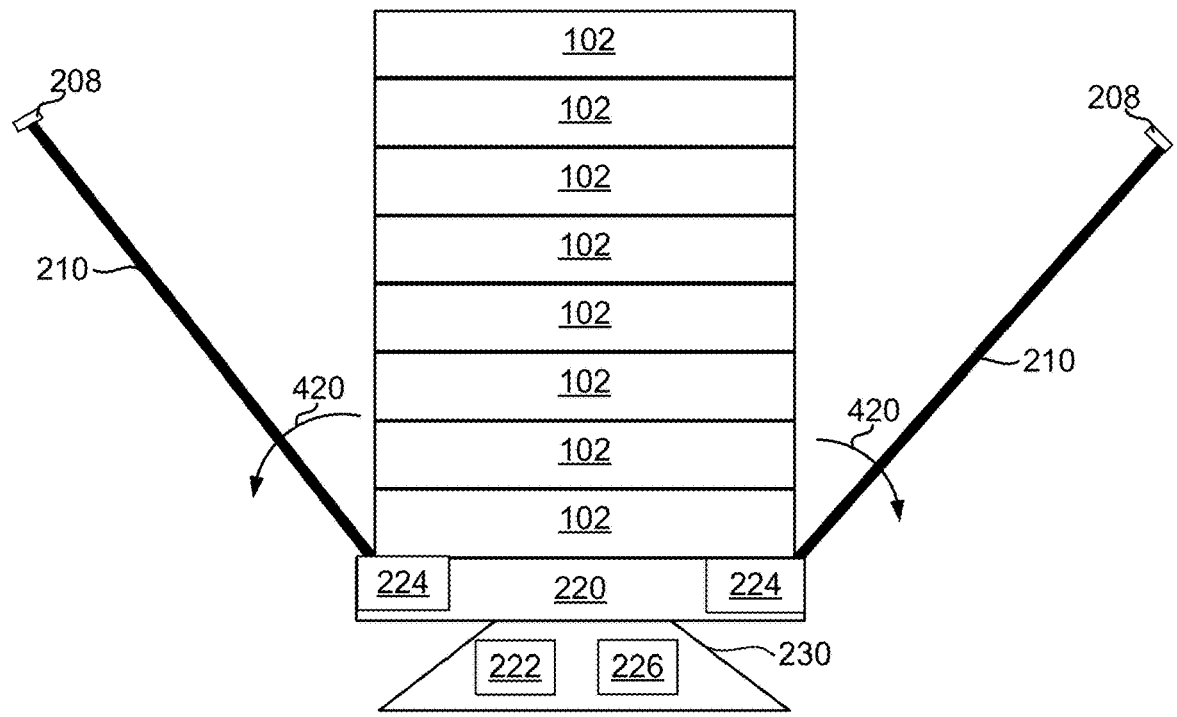
FIG. 4B depicts the tension rods being rotated by the pneumatic actuators into the deployment position.

A number of pneumatic actuators 224 are mechanically connected to the launch adaptor 220. There is one pneumatic actuator 224 for each hold-down rods 210. The pneumatic actuators 224 are used to slowly release the tension in the tension rods. In an embodiment, after the tension is released the pneumatic actuator 224 are used to disengage the hold-down rod assembly from the stack of spacecraft 102. FIG. 4A depicts a stack of spacecraft 102 after the tension in the tension rods 210 has been released by the pneumatic actuators 224. Moreover, the top clamp assemblies 208 no longer clamp down the stack. As will be discussed in more detail below the clamp assemblies 208 may have springs or the like to push the clamp assemblies off the top of the stack (see arrows 410). Moreover, the pneumatic actuators 224 are used to slowly release the tension in the tension rods 210. Therefore, shock to the spacecraft 102 is eliminated or at least significantly reduced. The pneumatic actuators 224 may also be used to rotate the tension rods 210 into a deployment position. FIG. 4B depicts the tension rods 210 being rotated (see arrows 420) by the pneumatic actuators 224 into the deployment position. In one embodiment, the tension rods 210 are rotated about 90 degrees from their original position. The pneumatic actuators 224 may also be used to prevent the tension rods 210 from bouncing back towards the stack.

Figure 5:
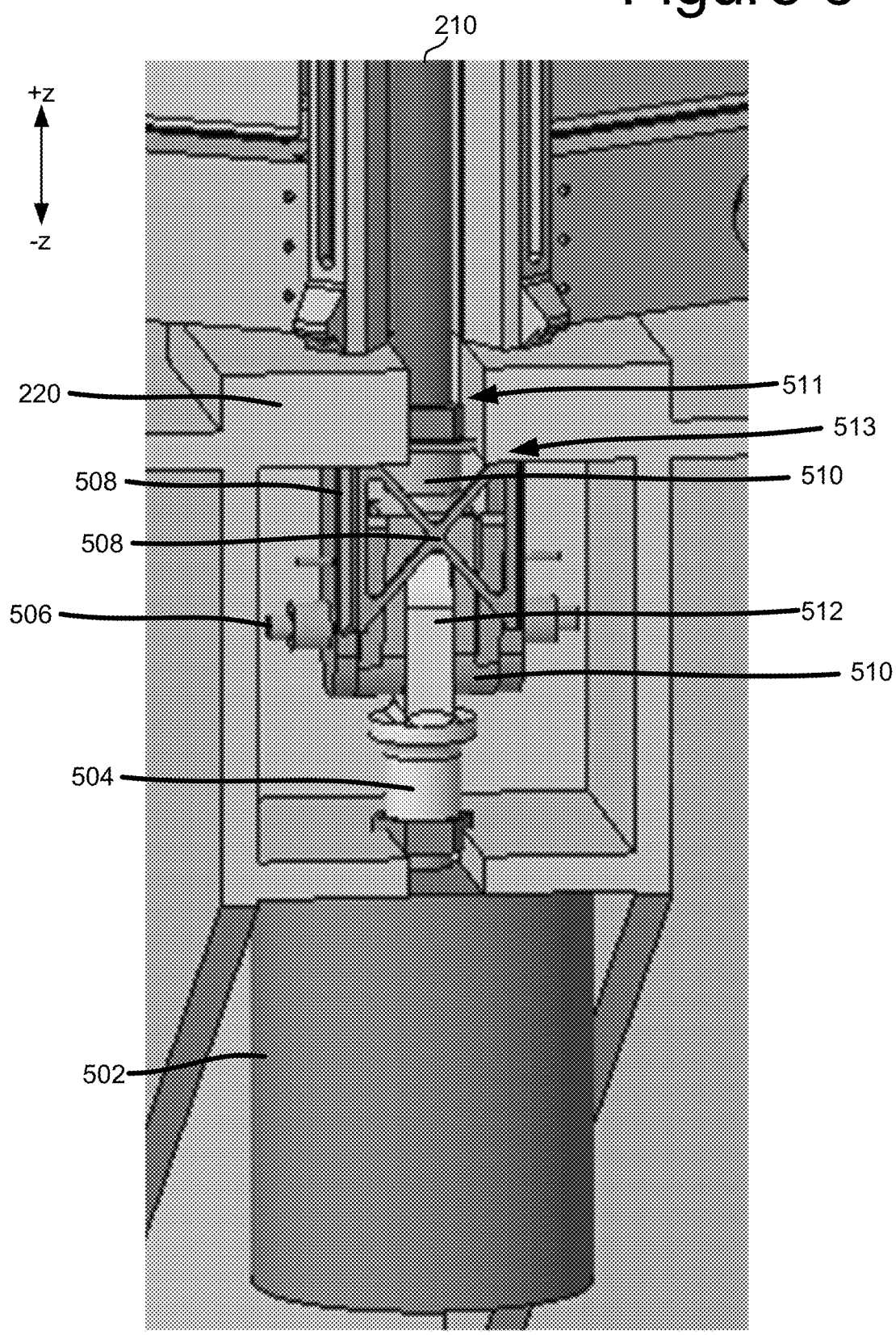
FIG. 5 is a close-up view of one embodiment of region 301 in FIG. 3.

FIG. 5 is a close-up view of one embodiment of region 301 in FIG. 3. The pneumatic actuator 224 has a cylinder 502 and an actuator rod assembly. In an embodiment, the actuator rod assembly has an actuator rod 504 and may have other elements such as an actuator joint 512 or the like to provide a mechanical connection to the connecting shaft 506. The actuator rod 504 is connected to a piston inside of the cylinder 502, but the piston is not depicted in FIG. 5. The pneumatic actuator 224 is able to move the actuator rod 504 up or down.

The tension rod 210 runs through a slot 511 in the launch adaptor 220. The tension rod 210 is connected to a tension rod joint 510, which is connected to the connecting shaft 506. Because the actuator rod joint 512 and the tension rod joint 510 are both connected to the connecting shaft 506, the actuator rod 504 is mechanically coupled to the tension rod 210. However, as will be discussed in more detail below the actuator rod 504 does not always support a load from the tension rod 210. For example, during launch and pre-deployment of the spacecraft 102, in an embodiment, the actuator rod 504 does not support a load from the tension rod 210. As depicted in FIG. 5, the tension rod joint 510 is a clevis having a forked joint. However, a forked joint is not required. The tension rod 210 and the tension rod joint 510 are part of a tension rod assembly.

Also depicted in FIG. 5 is a compression bracket 508. The compression bracket 508 is connected to the connecting shaft 506. Therefore, due to the common connections to the connecting shaft 506 the compression bracket 508 is mechanically coupled to the tension rod 210. In the configuration depicted in FIG. 5 the compression bracket 508 is in physical contact with an underside of a lip 513 in the launch adaptor 220. Thus, in the configuration depicted in FIG. 5 the compression bracket 508 is positioned such that a load of the hold-down rod assembly goes through the compression bracket 508. Therefore, the compression bracket 508 is able to support a load from the tension rod 210 during launch and pre-deployment of the spacecraft 102.

Figure 6:
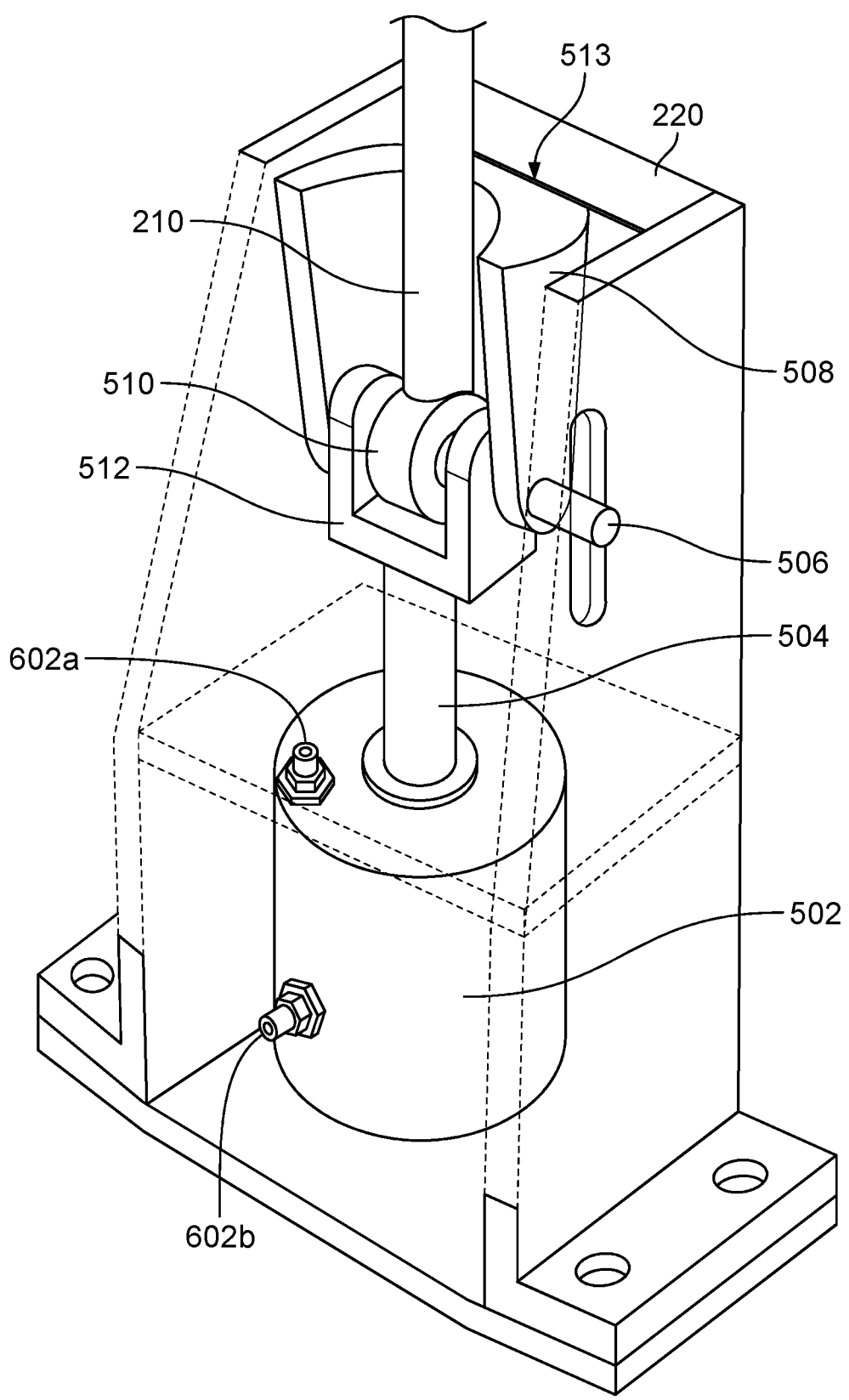
FIG. 6 is a perspective view of one embodiment of the pneumatic actuator and other elements.

FIG. 6 is a perspective view of one embodiment of the pneumatic actuator 224 and other elements. The cylinder 502 has two ports 602a, 602b. The ports 602 may be used to input gas to the cylinder 502 or release gas from the cylinder 502. As previously discussed there is a piston inside of the cylinder 502, but the piston is not depicted in FIG. 6. The piston has a top surface and a bottom surface. One port 602a may be used add or remove gas from above the piston and the other port 602b may be used to add or remove gas below the piston. Therefore the piston can be controlled very precisely to move either up or down. Consequently, the actuator rod 504 can be controlled very precisely to move either up or down. Moving the actuator rod 504 up in this context means that the actuator rod 504 will extend further out of the cylinder 504. Moving the actuator rod 504 down in this context means that the actuator rod 504 will be drawn into the cylinder 504.

The actuator rod assembly has an actuator rod 504 and an actuator joint 512. The actuator rod 504 is depicted as extending from an opening in the top of the cylinder 502. As previously noted the actuator rod 504 is connected to a piston inside of the cylinder 502, but the piston is not depicted in FIG. 6. The actuator rod 504 is connected to the connecting shaft 506 by actuator joint 512. As depicted in FIG. 6, the actuator joint 512 comprises a clevis having a forked connection to the connecting shaft 506. However, the actuator joint 512 is not required to be forked. The tension rod 210 is connected to the connecting shaft 506 by a tension rod joint 510. Therefore, the actuator rod 504 is mechanically coupled to the tension rod 210. Note that although the tension rod joint 510 depicted in FIG. 6 is not forked, in one embodiment, the tension rod joint 510 has a forked clevis that connects to the connecting shaft 506. The tension rod 210 and tension rod joint 510 are elements of a tension rod assembly.

Also depicted in FIG. 6 is the compression bracket 508. The compression bracket 508 is connected to the connecting shaft 506. Therefore, the compression bracket 508 is mechanically coupled to the tension rod 210. In the configuration depicted in FIG. 6 the compression bracket 508 is in physical contact with an underside of the lip 513 in the launch adaptor 220. As previously discussed, the actuator rod 504 does not support a load from the tension rod 210 when the compression bracket 508 supports the load from the tension rod 210. As depicted in FIG. 6 the compression bracket 508 supports the load from the tension rod 210.

In one embodiment, the pneumatic actuator 224 has an operating pressure of, for example, between 2,000 to 4,500 pounds per square inch (psi). However, the operating pressure could be lower than 2,000 psi or higher than 4,500 psi. In one embodiment, the cylinder 502 has a diameter of about 6 inches, although lower or greater diameters are contemplated. In one embodiment, the piston stroke is about 5 inches, although shorter or longer piston strokes are contemplated. In one embodiment, the pneumatic actuator has a cross section of about 27 square inches, although lower or greater cross sections are contemplated.

FIG. 7 is a flowchart of one embodiment of a process 700 of a controlled release of tension in a highly tensioned hold-down rod assembly. Process 700 will be discussed with reference to one pneumatic actuator 224 and one tension rod 210. The process 700 may be performed in parallel for a controlled release of tension in multiple tension rods 210 that clamp down a stack of spacecraft 102. Prior to an embodiment of process 700 the pneumatic actuator 224 is not actively in use. In an embodiment, the compression bracket 508 is positioned to take up the load from the tension rod 210 prior to the process 700. FIGS. 5 and 6 each depict examples in which the compression bracket 508 is positioned to take up the load from the tension rod 210. While the compression bracket 508 is taking up the load from the tension rod 210 the pneumatic actuator rod 504 is not taking up the load from the tension rod 210. Thus, it may be stated that the compression bracket 508 is used to bypass the pneumatic actuator 224.

Step 702 includes operating the pneumatic actuator 224 in a pull-mode to transfer the load of the tension rod 210 to actuator rod 504. In one embodiment, the actuator rod 504 is moved downward (e.g., in the negative z-direction) to move the compression bracket 508 away from lower side of the lip 513 of the launch adaptor 220. Then, the compression bracket 508 may be rotated outward from the launch adaptor 220. In one embodiment, a spring is used to push the compression bracket 508 away from the launch adaptor 220. The tension in the spring may be pre-loaded such that once the compression bracket 508 is no longer physically in contact with the lower side of the lip 513 of the launch adaptor 220 the compression bracket 508 is free to rotate about the connecting shaft 506. As one example, compression bracket 508 could rotate about the connecting shaft 506 about, for example, 90 degrees. When the compression bracket 508 no longer supports the load from the tension rod 210 the actuator rod 504 is loaded by the tension rod 210.

Figure 8A:
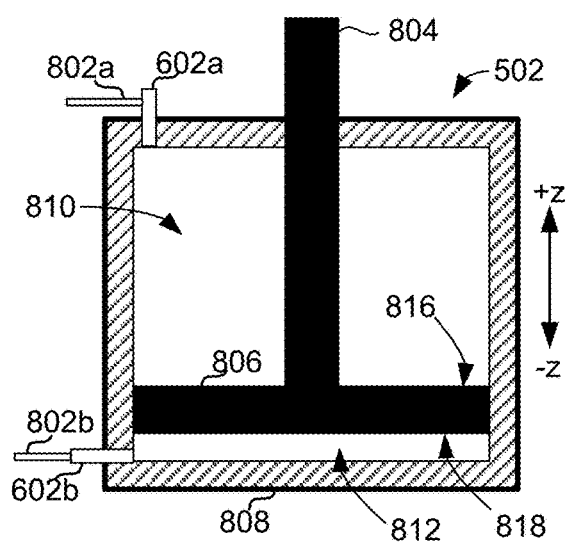
FIGS. 8A, 8B, 8C, and 8D each depict a cross-sectional view one embodiment of the pneumatic actuator in different stages of use.
Figure 8B:
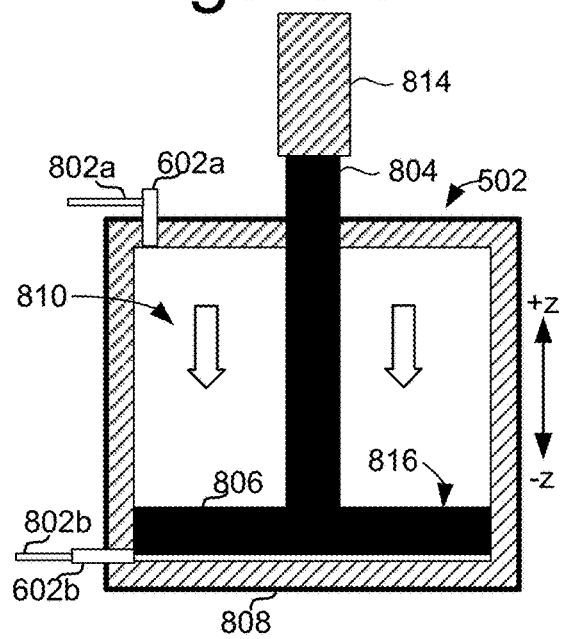

FIGS. 8A and 8B provide further details of one embodiment of step 702. FIG. 8A depicts a cross-sectional view one embodiment of the pneumatic actuator 224. The cylinder 502 has an outer wall 808 and contains a piston 806. The piston 806 is connected to the actuator rod assembly 804. The piston 806 has a top surface 816 that is on the side of the piston 806 that is connected to the actuator rod assembly 804. The piston 806 has a bottom surface 818 that is on the opposite side of the piston 806 that is connected to the actuator rod assembly 804. The terms "top" and "bottom" are used relative to the positive z-direction (+z) and the negative z-direction (−z). In an embodiment, the actuator rod assembly 804 has an actuator rod (see actuator rod 504 in FIG. 5 or 6) connected to the piston 806 and an actuator joint (see actuator joint 512 in FIG. 5 or 6), which may be connected to a connecting shaft (see connecting shaft 506 in FIG. 5 or 6). The actuator rod extends outside of the cylinder 502. The surface of cylinder 502 from which the actuator rod emerges may be referred to as a top surface of the cylinder 502. A top port 602a allows gas to be added or removed from a top chamber 810 above the piston 806. The top port 602a is connected to a top gas line 802a. A bottom port 602b allows gas to be added or removed from a bottom chamber 812 below the piston 806. The bottom port 602b is connected to a bottom gas line 802b. The respective gas lines 802a, 802b may be connected to a pressurized gas tank (e.g., tank 226 in FIG. 2). In one embodiment, gas can be routed from the top chamber 810 to the bottom chamber 812. The top chamber 810 is on the same side of the piston 806 as the actuator rod. The bottom chamber 812 is on the opposite side of the piston 806 as the actuator rod. The top chamber 810 is adjacent to the top surface 816 of piston 806. Thus, the top chamber 810 is bounded on one side by top surface 816 of piston 806 and bounded on other sides by portions of the outer wall 808 of the cylinder 502. The bottom chamber 812 is adjacent to the bottom surface 818 of piston 806. Thus, the bottom chamber 812 is bounded on one side by bottom surface 818 of piston 806 and bounded on other sides by portions of the outer wall 808 of the cylinder 502.

In FIG. 8A, the actuator rod assembly does not take up any significant amount of load from the tension rod 210. FIG. 8B depicts gas being added through the top port 602a to increase the gas pressure in the top chamber 810, thereby causing the piston 806 and actuator rod assembly 804 to move downward. The term downward means in the negative z-direction (−z). Moving the piston 806 and actuator rod assembly 804 downward (e.g., −z direction) may also be referred to as a pull-mode. A tension rod assembly 814 is depicted in FIG. 8B to represent the load on the actuator rod assembly 804 from the tension rod assembly 814. The tension rod assembly 814 may include the tension rod 210 and a tension rod joint (see, for example, tension rod joint 510 in FIG. 5 or 6), which may be connected to a connecting shaft (see connecting shaft 506 in FIG. 5 or 6).

Step 704 includes operating the pneumatic actuator 224 to perform a controlled release of the tension in the tension rod 210. In one embodiment, a piston in the cylinder 502 of the pneumatic actuator is controlled to slowly allow the actuator rod assembly to move upwards to thereby slowly release the tension in the tension rod 210. Step 704 may include slowly releasing gas from the top chamber 810 of the cylinder 502 to slowly release the tension in the tension rod 210.

Figure 8C:
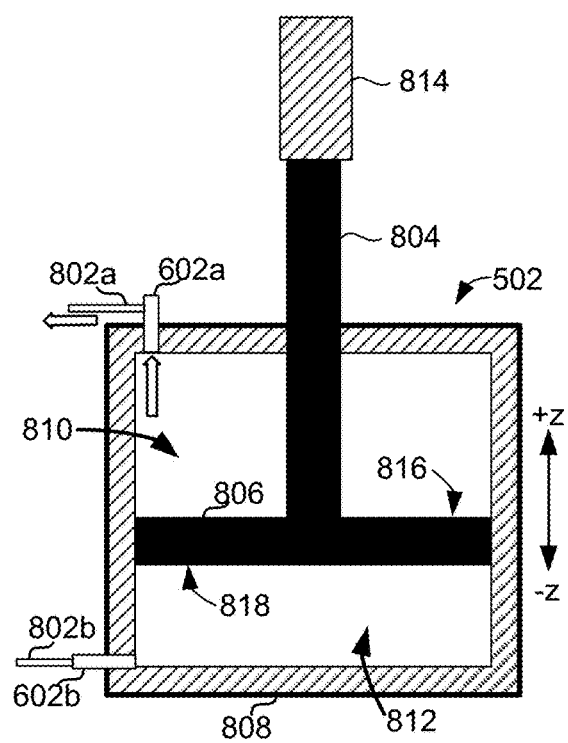
Figure 8D:
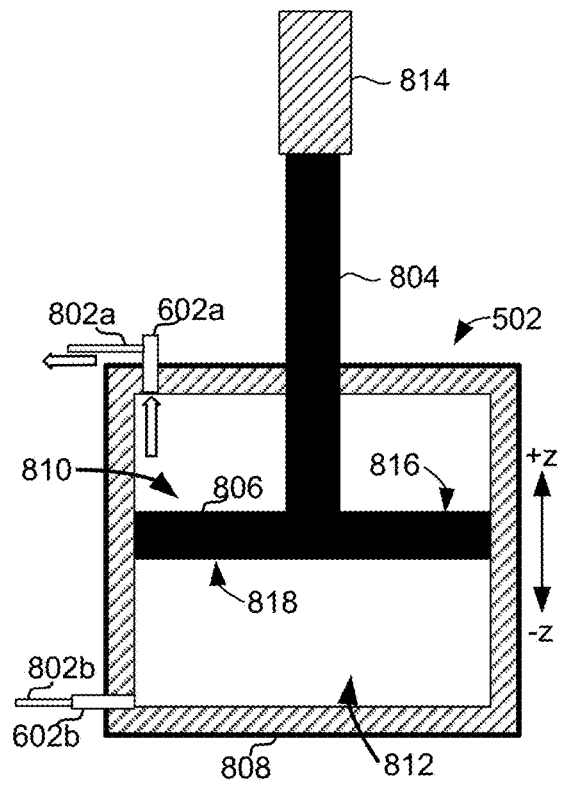

FIGS. 8C and 8D provide further details of one embodiment of step 704. FIGS. 8C and 8D each depicts a cross-sectional view one embodiment of the pneumatic actuator 224, showing further operation of the pneumatic actuator 224 after gas was added to the top chamber 810 as depicted in FIG. 8B. FIGS. 8C and 8D shows that as gas is slowly released (e.g., vented) from the top chamber 810 the piston 806 slowly moves upward in a controlled manner. Therefore, tension in the tension rod 210 is slowly released in a controlled manner. Note that the tension rod 210 may be applying an upward force (e.g., in the positive z-direction) on the actuator rod assembly 804 as the tension is slowly being released. The gas exits the top chamber 810 by way of the top port 602a and the top gas line 802a. In one embodiment, the gas from the top chamber 810 is routed to bottom gas line 802b and through bottom port 602b into bottom chamber 812. However, it is not required that the gas from the top chamber 810 be routed to the bottom chamber 812.

Figure 9A:
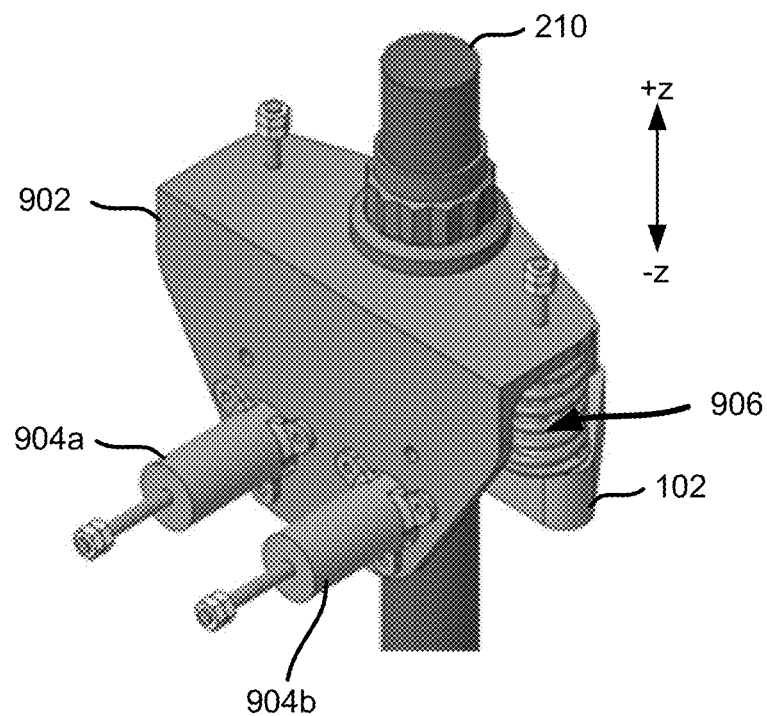
FIG. 9A depicts a perspective view of one embodiment of a top clamp assembly.
Figure 9B:
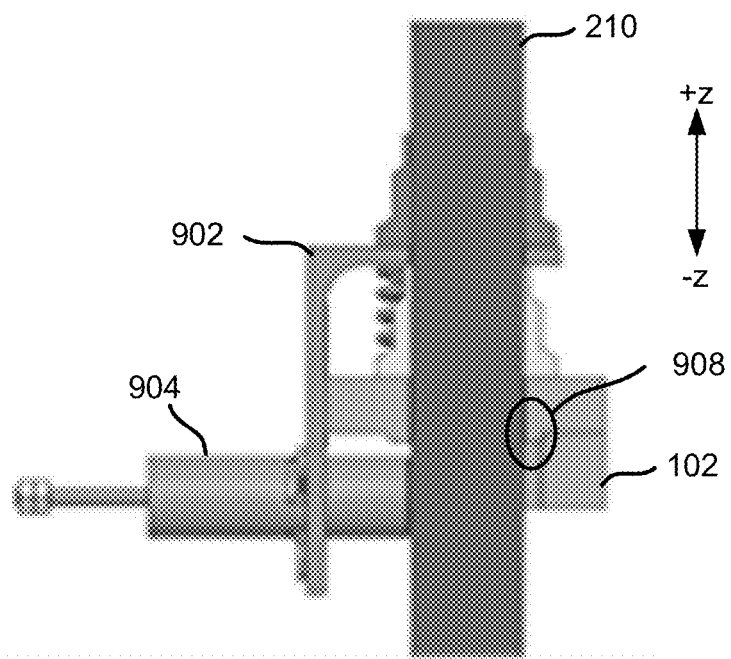
FIG. 9B depicts a side view of the top clamp assembly depicted in FIG. 9A.
Figure 9C:
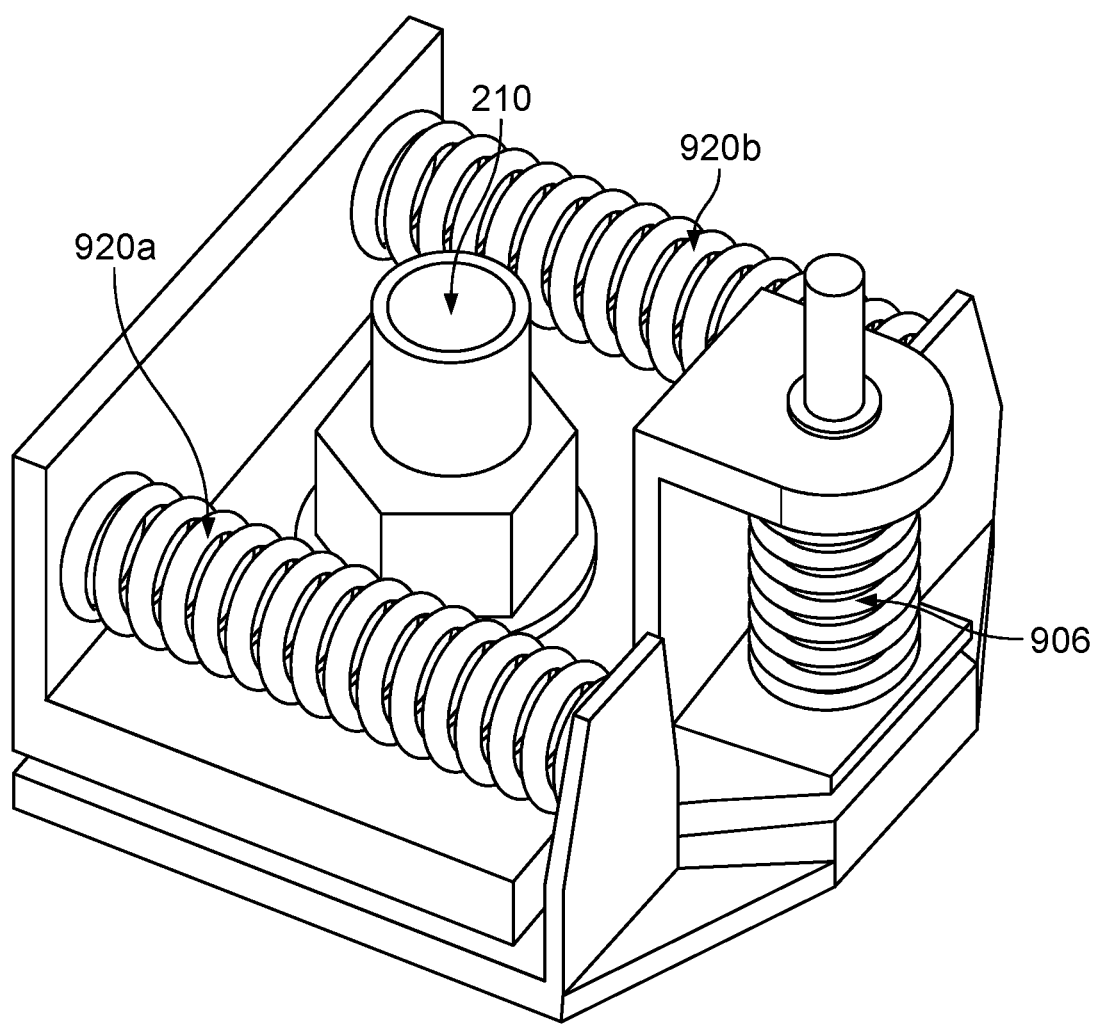
FIG. 9C depicts a perspective view of one embodiment of the top clamp assembly.

After the tension in the tension rod 210 has been released by the pneumatic actuator, 224 springs (or the like) in the top clamp assembly 208 may automatically disengage the hold-down rod assembly from the top of the stack of spacecraft 102. FIG. 9A depicts a perspective view of one embodiment of a top clamp assembly 208 with the tension rod 210. FIG. 9B depicts a side view of the top clamp assembly 208. FIG. 9C depicts a perspective view of one embodiment of the top clamp assembly 208. With reference to FIGS. 9A, 9B, and/or 9C a corner of the spacecraft 102 is depicted. Spring 906 resides between the top of the spacecraft 102 and the bracket 902. In the launch configuration the spring 906 will be compressed by the tension in the tension rod 210. When the tension in the tension rod 210 is released the spring 906 will push the bracket 902 upwards. In one embodiment, the top clamp assembly 208 has a cup/cone interface (see cup/cone interface 908 in FIG. 9B) that helps to hold the clamp assembly 208 in place during launch. When the tension in the tension rod 210 is slowly released the cone is separate from the cup to allow the bracket 902 to be disengaged from the spacecraft 102. In an embodiment, the spring 906 will separate the cup from the cone. Spring holders 904a, 904b contain springs (see springs 920a, 920b in FIG. 9C) that can push the bracket 902 and hence the tension rod 210 away from the spacecraft 102. The springs 920 inside the spring holders 904 are pre-loaded when in the launch configuration.

After the pneumatic actuator 224 has been used to remove tension in the tension rod 210, the pneumatic actuator 224 may be used to rotate the tension rod 210 into a deployment position. Returning again to FIG. 7, step 706 includes operating the pneumatic actuator 224 in a push-mode to rotate the tension rod 210 into the deployment position. In an embodiment, there is a mechanical linkage to convert linear motion of the actuator rod 504 to rotational motion of the tension rod 210. The mechanical linkage could include, for example, a cam. In an alternative embodiment, a spring or the like is used to rotate the tension rod 210 into the deployment position. If a spring is used to rotate the tension rod 210 then the pneumatic actuator 224 need not be used to move the tension rod 210 into the deployment position. FIG. 4B shows one example of tension rods 210 being rotated (see arrows 420) into the deployment position.

Figure 10:
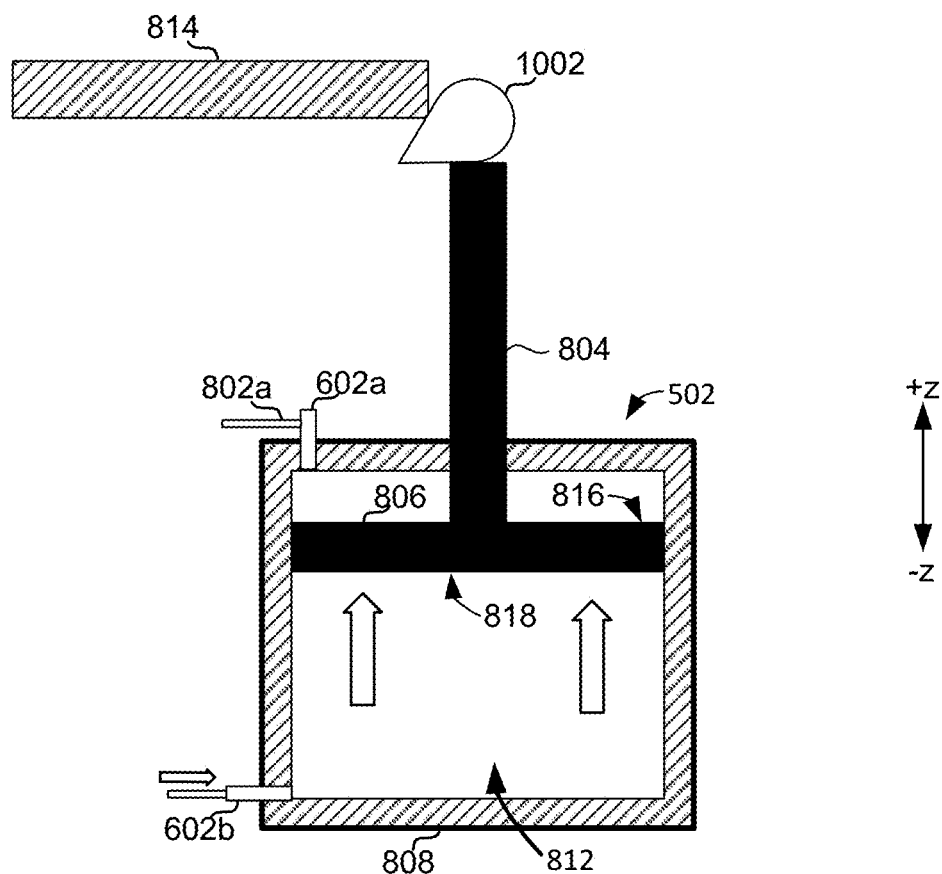
FIG. 10 provide further details of one embodiment of operating the pneumatic actuator.

FIG. 10 provide further details of one embodiment of operating the pneumatic actuator in step 706 to rotate the tension rod 210 to the deployment position. FIG. 10 depicts a cross-sectional view one embodiment of the pneumatic actuator 224, showing further operation of the pneumatic actuator 224 relative to FIG. 8D. FIG. 10 shows that gas is added into the bottom chamber 812, thereby exerting an upward force on the piston 806. A mechanical linkage 1002 is used to translate linear motion in the actuator rod assembly 804 to rotate the tension rod assembly 814 into the deployment position. In one embodiment, the mechanical linkage 1002 has a cam to translate linear motion to rotational motion.

Figure 11:
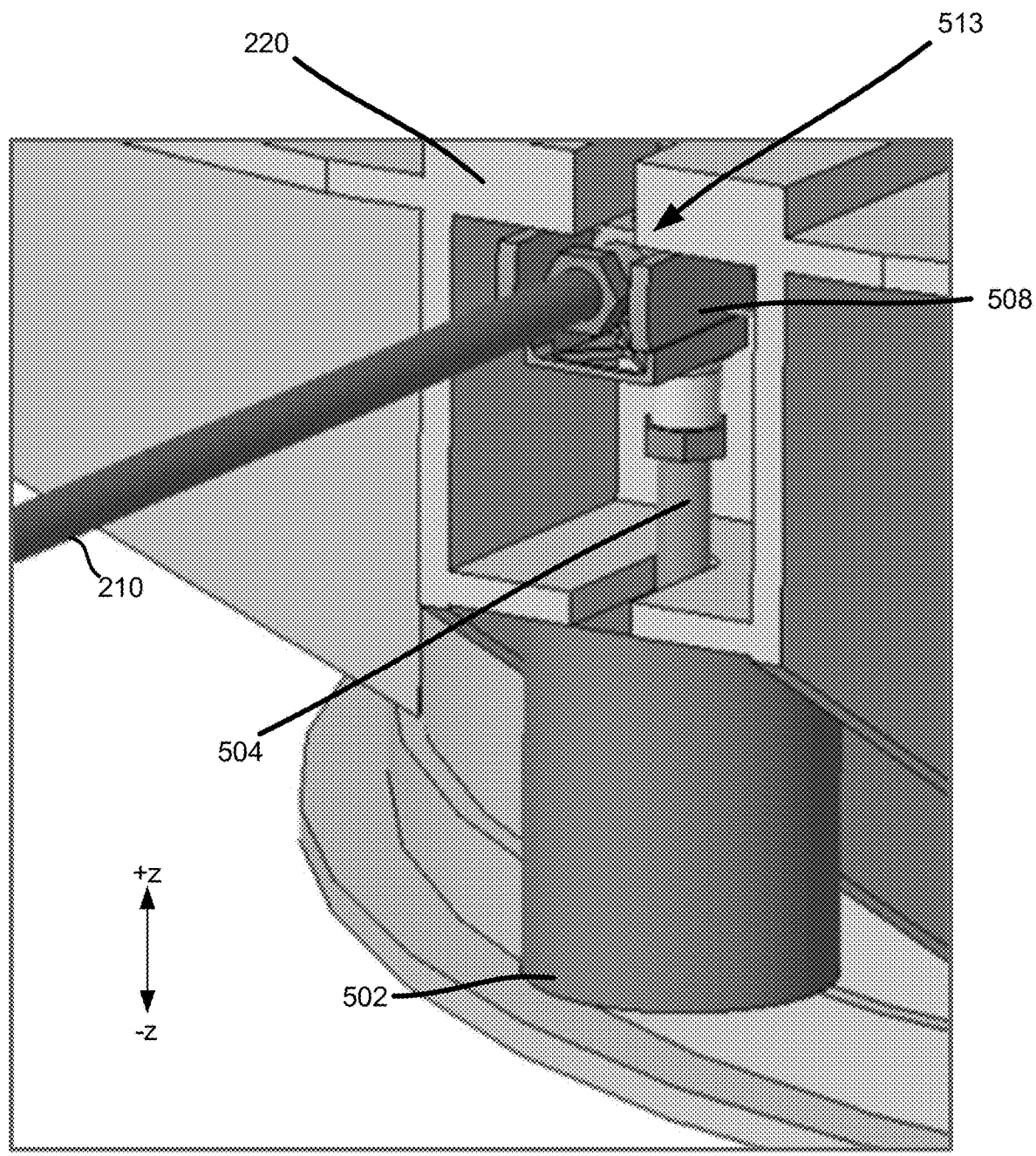
FIG. 11 shows further details of a tension rod in the deployment position.

FIG. 11 shows further details of the tension rod 210 in the deployment position. FIG. 11 depicts a view of the pneumatic actuator 224 similar to FIG. 5. However, whereas FIG. 5 depicts the tension rod 210 in the launch configuration, FIG. 11 depicts the tension rod 210 in the deployment configuration. The tension rod 210 has been rotated about 90 degrees from the launch configuration to get to the deployment configuration. The compression bracket 508 is depicted in a position in which it is not in contact with the lower side of the lip 513 of the launch adaptor 220. As was discussed in connection with step 702 in FIG. 7, in one embodiment, the compression bracket 508 is rotated from the position depicted in FIG. 5 to the position depicted in FIG. 11. However, the tension rod 210 will remain in the launch configuration upon completion of step 702.

Figure 12:
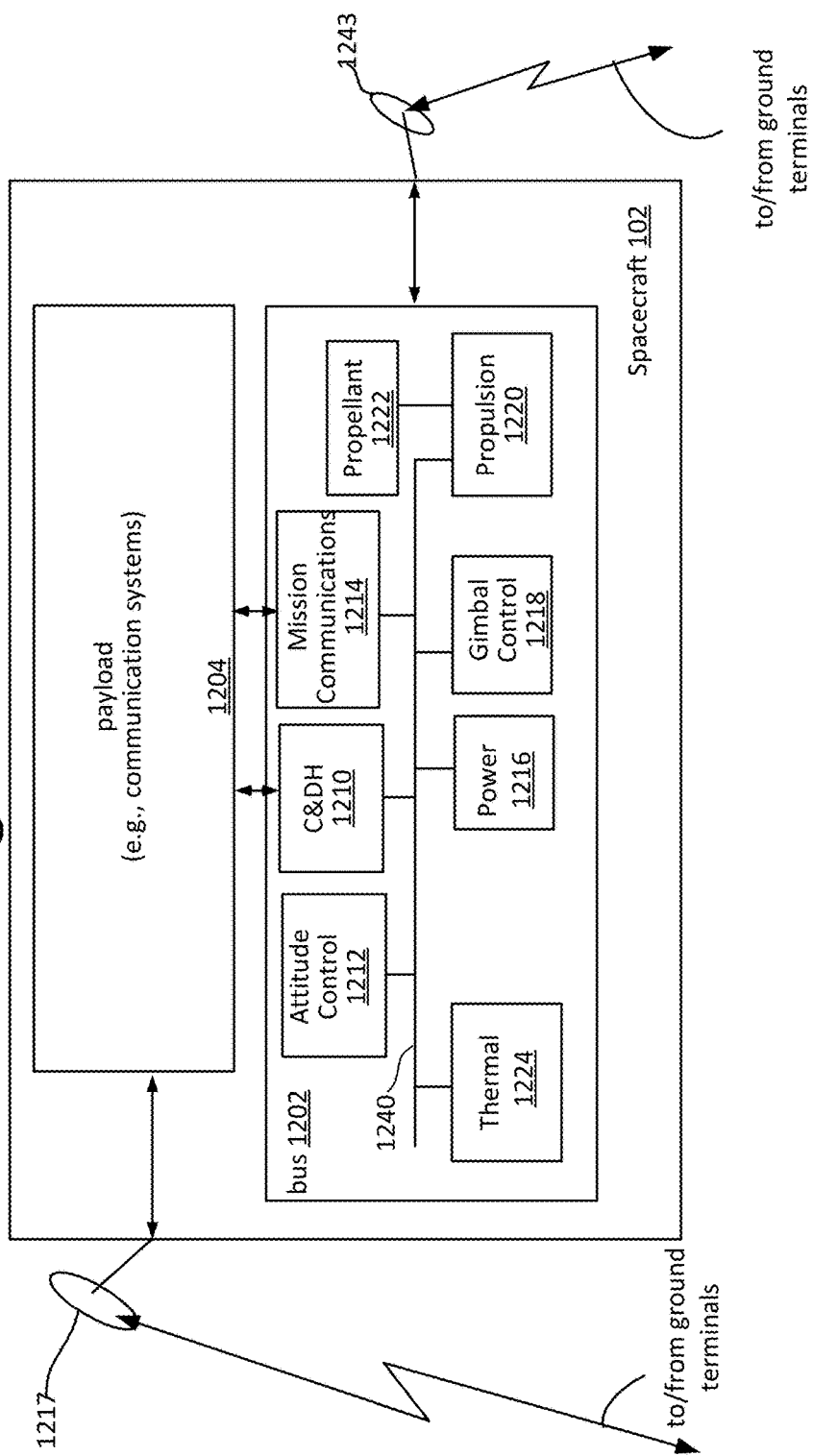
FIG. 12 is a block diagram of one embodiment of spacecraft, which in one example is a satellite.

FIG. 12 is a block diagram of one embodiment of spacecraft 102, which in one example (as discussed above) is a satellite. In one embodiment, spacecraft 102 includes a bus 1202 and a payload 1204 carried by bus 1202. Some embodiments of spacecraft 102 may include more than one payload. The payload provides the functionality of communication, sensors and/or processing systems needed for the mission of spacecraft 102.

In general, bus 1202 is the spacecraft that houses and carries the payload 1204, such as the components for operation as a communication satellite. The bus 1202 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 1210, attitude control systems 1212, mission communication systems 1214, power subsystems 1216, gimbal control electronics 1218 that be taken to include a solar array drive assembly, a propulsion system 1220 (e.g., thrusters), propellant 1222 to fuel some embodiments of propulsion system 1220, and thermal control subsystem 1224, all of which are connected by an internal communication network 1240, which can be an electrical bus (a "flight harness") or other means for electronic, optical or RF communication when spacecraft is in operation. Also represented are an antenna 1243, that is one of one or more antennae used by the mission communication systems 1214 for exchanging communications for operating of the spacecraft with ground terminals, and a payload antenna 1217, that is one of one or more antennae used by the payload 1204 for exchanging communications with ground terminals, such as the antennae used by a communication satellite embodiment. Other equipment can also be included.

The command and data handling module 1210 includes any processing unit or units for handling includes command control functions for spacecraft 102, such as for attitude control functionality and orbit control functionality. The attitude control systems 1212 can include devices including torque rods, wheel drive electronics, and control momentum gyro control electronics, for example, that are used to monitor and control the attitude of the spacecraft. Mission communication systems 1214 includes wireless communication and processing equipment for receiving telemetry data/commands, other commands from the ground control terminal 30 to the spacecraft and ranging to operate the spacecraft. Processing capability within the command and data handling module 1210 is used to control and operate spacecraft 102. An operator on the ground can control spacecraft 102 by sending commands via ground control terminal 30 to mission communication systems 1214 to be executed by processors within command and data handling module 1210. In one embodiment, command and data handling module 1210 and mission communication system 1214 are in communication with payload 1204. In some example implementations, bus 1202 includes one or more antennae as indicated at 1243 connected to mission communication system 1214 for wirelessly communicating between ground control terminal 30 and mission communication system 1214. Power subsystems 1216 can include one or more solar panels and charge storage (e.g., one or more batteries) used to provide power to spacecraft 102. Propulsion system 1220 (e.g., thrusters) is used for changing the position or orientation of spacecraft 102 while in space to move into orbit, to change orbit or to move to a different location in space. The gimbal control electronics 1218 can be used to move and align the antennae, solar panels, and other external extensions of the spacecraft 102.

In one embodiment, the payload 1204 is for a communication satellite and includes an antenna system (represented by the antenna 1217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 1214 acts as an interface that uses the antennae of payload 1204 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

Figure 13:
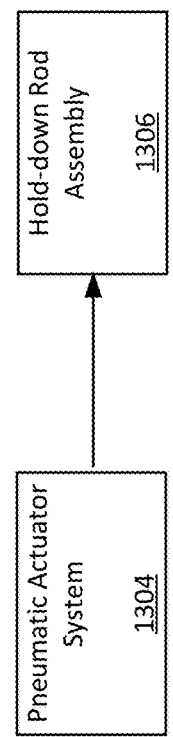
FIG. 13 depicts one embodiment of a system for releasing tension in a hold-down rod assembly.

FIG. 13 depicts one embodiment of a system for releasing tension in a hold-down rod assembly. The system 1300 may be referred to herein as an apparatus. The system 1300 includes a pneumatic actuator system 1304 and a hold-down assembly 1306. The pneumatic actuator system 1304 include the pneumatic actuators 224 and associated elements such as pressurized gas tanks (e.g., tank 226), gas lines (e.g., gas lines 802a, 802b), etc. The pneumatic actuator system 1304 may also include a controller that operates the pneumatic actuators 224. The hold-down assembly 1306 may include a tension rod assembly (e.g., tension rod 210, tension rod joint 510) and a clamp assembly 208. A controller of the pneumatic actuator system 1304 may issue control signals to control the release of tension in the tension rods 210. The control signals may be transmitted wirelessly, by wireline, or by a combination of wirelessly and wireline. In an embodiment, the controller issues control signals to implement process 700. The controller may reside in the launch vehicle, in ground control 30, or in a combination of the launch vehicle and ground control 30. In one embodiment, the controller resides in launch vehicle adaptor. For example, the controller may be implemented within control circuit 222. The controller may comprise hardware and/or software. The controller could include one or more of a processor (e.g., micro-processor), PGA (Programmable Gate Array, FPGA (Field Programmable Gate Array), ASIC (Application Specific Integrated Circuit), integrated circuit or other type of circuit.

A first embodiment includes an apparatus comprising a hold-down rod assembly configured to hold down a stack of spacecraft to a launch vehicle adaptor. The hold-down rod assembly has a tension rod under tension when holding down the stack of spacecraft to the launch vehicle adaptor. The apparatus further comprises a pneumatic actuator system mechanically coupled to the hold-down rod assembly and to the launch vehicle adaptor The pneumatic actuator system is configured to perform a controlled release of the tension in the tension rod.

In a second embodiment, in furtherance of the first embodiment, the apparatus further comprises a compression bracket mechanically coupled to the pneumatic actuator system. The compression bracket has a first position in which the compression bracket is between the hold-down rod assembly and the launch vehicle adaptor to take a load from the hold-down rod assembly when the pneumatic actuator system is not loaded by the hold-down rod assembly.

In a third embodiment, in furtherance of the second embodiment, the pneumatic actuator system is configured to operate in a pull-mode to move the compression bracket from the first position such that the pneumatic actuator system takes the load from the hold-down rod assembly instead of the compression bracket.

In a fourth embodiment, in furtherance of any of the second to third embodiments the pneumatic actuator system comprises a cylinder, a piston within the cylinder, and an actuator rod assembly connected to the piston and extending out of the cylinder. The actuator rod assembly is mechanically coupled to the hold-down rod assembly. The cylinder comprises a top chamber above the piston and a bottom chamber below the piston. The pneumatic actuator system is configured to add gas to the top chamber to increase gas pressure in the top chamber to operate in the pull-mode.

In a fifth embodiment, in furtherance of any of the first to fourth embodiments the pneumatic actuator system comprises a cylinder, a piston within the cylinder, and an actuator rod assembly connected to the piston and extending out of the cylinder. The actuator rod assembly is mechanically coupled to the hold-down rod assembly. The cylinder comprises a top chamber adjacent a first surface of the piston connected to the actuator rod assembly and a bottom chamber adjacent a second surface of the piston opposite the first surface. The pneumatic actuator system is configured to remove gas from the top chamber to decrease gas pressure in the top chamber to control the release of the tension in the tension rod.

In a sixth embodiment, in furtherance of any of the first to fourth embodiments, the pneumatic actuator system comprises a cylinder, a piston within the cylinder, and an actuator rod assembly connected to the piston and extending out of the cylinder. The actuator rod assembly is mechanically coupled to the hold-down rod assembly. The cylinder comprises a top chamber adjacent a first surface of the piston connected to the actuator rod assembly and a bottom chamber adjacent a second surface of the piston opposite the first surface. The pneumatic actuator system is configured to route gas from the top chamber to the bottom chamber to decrease gas pressure in the top chamber and increase gas pressure in the bottom chamber to control the release of the tension in the tension rod.

In a seventh embodiment, in furtherance of any of the first to sixth embodiments, the hold-down rod assembly further comprises a clamp assembly positioned at a top of the stack of spacecraft. The tension rod is connected to the clamp assembly. The clamp assembly is configured to disengage the hold-down rod assembly from the top of the stack of spacecraft upon release of the tension in the tension rod.

In an eighth embodiment, in furtherance of any of the first to seventh embodiments, the pneumatic actuator system is further configured to rotate the tension rod outward from the stack to permit deployment of the spacecraft after the controlled release of the tension in the tension rod.

In a ninth embodiment, in furtherance of any of the eighth embodiment, the pneumatic actuator system comprises a cylinder, a piston within the cylinder, an actuator rod assembly connected to the piston and extending out of the cylinder. The actuator rod assembly comprises an actuator rod connected to the piston and a mechanical linkage connected between the actuator rod and the hold-down rod assembly. The mechanical linkage is configured to convert linear motion of the actuator rod to rotational motion in the hold-down rod assembly to rotate the tension rod outward from the stack. In one embodiment, the mechanical linkage comprises a cam.

In a tenth embodiment, in furtherance of any of the first to ninth embodiments, the hold-down rod assembly comprises a plurality of the tension rods and a corresponding plurality of top clamp assemblies. Each top clamp assembly is positioned at a top of the stack of spacecrafts. Each tension rod is positioned under tension between one of the top clamp assemblies and the launch vehicle adaptor. The pneumatic actuator system comprises a plurality of pneumatic actuators. Each pneumatic actuator is configured to perform the controlled release of the tension in one of the tension rods.

One embodiment includes a method for operating a spacecraft hold-down and release mechanism. The method comprises transferring a load of a tension rod assembly of the spacecraft hold-down and release mechanism from a compression bracket to a pneumatic actuator. The tension rod assembly holds down a stack of spacecraft under tension prior to and after transferring the tension. The method also includes controlling the pneumatic actuator to release the tension in the tension rod assembly in a controlled manner.

One embodiment includes a spacecraft deployment system comprising a launch vehicle adaptor configured to mechanically coupled to a launch vehicle, a hold-down rod assembly having a plurality of tension rods, a plurality of actuators mechanically coupled to the launch vehicle adaptor, and a control circuit in communication with the plurality of actuators. The tension rods are configured to hold a stack of spacecraft to the launch vehicle adaptor under tension when in a launch configuration. Each actuator has a cylinder, a piston within the cylinder, and an actuator rod assembly connected to the piston and extending out of the cylinder. The actuator rod assembly is mechanically coupled to one of the tension rods. The control circuit is configured to operate the plurality of actuators to move the respective cylinders to release the tension in the tension rods.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An apparatus comprising:
   a hold-down rod assembly configured to hold down a stack of spacecraft to a launch vehicle adaptor, wherein the hold-down rod assembly comprises a tension rod under tension when holding down the stack of spacecraft to the launch vehicle adaptor;
   a pneumatic actuator system mechanically coupled to the hold-down rod assembly and to the launch vehicle adaptor, wherein the pneumatic actuator system comprises a cylinder, a piston within the cylinder, and an actuator rod assembly connected to the piston and extending out of the cylinder, wherein the actuator rod assembly is mechanically coupled to the hold-down rod assembly, wherein the cylinder comprises a top chamber adjacent a first surface of the piston connected to the actuator rod assembly and a bottom chamber adjacent a second surface of the piston opposite the first surface, wherein the pneumatic actuator system performs a controlled release of gas from the top chamber to perform a controlled release of the tension in the tension rod; and
   a compression bracket mechanically coupled to the tension rod, wherein the compression bracket has a first position in which the compression bracket contacts the launch vehicle adaptor to take a load of the hold-down rod assembly such that the actuator rod assembly is not loaded by the hold-down rod assembly, wherein the compression bracket has a second position in which the actuator rod assembly is loaded by the hold-down rod assembly instead of the compression bracket;
   wherein the pneumatic actuator system is configured to move the compression bracket from the first position to the second position such that the actuator rod assembly takes the load from the hold-down rod assembly prior to performing the controlled release of the tension in the tension rod.

2. The apparatus of claim 1, wherein the pneumatic actuator system is configured to operate in a pull-mode to cause the compression bracket to move from the first position to the second position such that the pneumatic actuator system takes the load from the hold-down rod assembly instead of the compression bracket.

3. The apparatus of claim 2, wherein:
the pneumatic actuator system adds the gas to the top chamber to increase gas pressure in the top chamber to operate in the pull-mode.

4. The apparatus of claim 1, wherein:
the pneumatic actuator system routes the gas from the top chamber to the bottom chamber to decrease gas pressure in the top chamber and increase gas pressure in the bottom chamber to control the release of the tension in the tension rod.

5. The apparatus of claim 1, wherein:
the hold-down rod assembly further comprises a clamp assembly positioned at a top of the stack of spacecraft, wherein the tension rod is connected to the clamp assembly; and
the clamp assembly is configured to disengage the hold-down rod assembly from the top of the stack of spacecraft upon release of the tension in the tension rod.

6. The apparatus of claim 1, wherein:
the pneumatic actuator system is further configured to rotate the tension rod outward from the stack to permit deployment of the spacecraft after the controlled release of the tension in the tension rod.

7. The apparatus of claim 6, wherein:
the actuator rod assembly comprises an actuator rod connected to the piston and a mechanical linkage connected between the actuator rod and the hold-down rod assembly; and
the mechanical linkage is configured to convert linear motion of the actuator rod to rotational motion in the hold-down rod assembly to rotate the tension rod outward from the stack.

8. The apparatus of claim 1, wherein:
the hold-down rod assembly comprises a plurality of tension rods and a corresponding plurality of top clamp assemblies, each top clamp assembly positioned at a top of the stack of spacecraft, each tension rod positioned under tension between one of the top clamp assemblies and the launch vehicle adaptor; and
the pneumatic actuator system comprises a plurality of pneumatic actuators, each pneumatic actuator configured to perform the controlled release of the tension in one of the tension rods.

9. A method for operating a spacecraft hold-down and release mechanism, the method comprising:
operating a pneumatic actuator in a pull-mode to transfer a load of a tension rod assembly of the spacecraft hold-down and release mechanism from a compression bracket to a pneumatic actuator, wherein the tension rod assembly holds down a stack of spacecraft under tension prior to and after transferring the tension to the pneumatic actuator, including moving the compression bracket from a first position in which the compression bracket contacts a launch vehicle adaptor to take the load of the tension rod to a second position in which the compression bracket does not contact the launch vehicle adaptor whereby the pneumatic actuator is loaded by the tension rod instead of the compression bracket; and
controlling the pneumatic actuator to release the tension in the tension rod assembly in a controlled manner after transferring the tension in the tension rod assembly to the pneumatic actuator, including removing gas from a top chamber of a cylinder of the pneumatic actuator to decrease gas pressure in the top chamber to release the tension in the tension rod assembly in the controlled manner, wherein the cylinder comprises a piston having a top surface connected to an actuator rod assembly that is connected to the tension rod assembly, wherein the top chamber is adjacent a top surface of the piston.

10. The method of claim 9, wherein controlling the pneumatic actuator to release the tension in the tension rod assembly in a controlled manner further comprises:
routing the gas from the top chamber of the cylinder of the pneumatic actuator to a bottom chamber of the cylinder to decrease gas pressure in the top chamber and increase gas pressure in the bottom chamber, wherein the bottom chamber is adjacent a bottom surface of the piston opposite the top surface.

11. The method of claim 9, wherein transferring the load of the tension rod assembly of the spacecraft hold-down and release mechanism from the compression bracket to the pneumatic actuator comprises:
adding the gas to the top chamber to operate the pneumatic actuator in the pull-mode.

12. The method of claim 9, further comprising:
operating the pneumatic actuator to rotate the tension rod to a deployment position, including translating linear motion of an actuator rod of the pneumatic actuator to rotational motion of the tension rod.

13. A spacecraft deployment system comprising:
a launch vehicle adaptor configured to mechanically couple to a launch vehicle;
a hold-down rod assembly having a plurality of tension rods, wherein the tension rods are configured to hold a stack of spacecraft to the launch vehicle adaptor under tension when in a launch configuration;
a plurality of actuators mechanically coupled to the launch vehicle adaptor, each actuator comprising a cylinder, a piston within the cylinder, and an actuator rod assembly connected to the piston and extending out of the cylinder, wherein the actuator rod assembly is mechanically coupled to one of the tension rods, wherein each cylinder comprises a top chamber adjacent a first surface of the piston connected to the actuator rod assembly and a bottom chamber adjacent a second surface of the piston opposite the first surface;
a plurality of compression brackets, each compression bracket mechanically coupled to the actuator rod of one of the actuators, wherein each compression bracket has a first position in which the compression bracket contacts the launch vehicle adaptor to receive a load from the hold-down rod assembly wherein the corresponding actuator is not loaded by the hold-down rod assembly, each compression bracket has a second position in which the actuator rod assembly is loaded by the hold-down rod assembly instead of the compression bracket; and
a control circuit in communication with the plurality of actuators, wherein the control circuit operates the plurality of actuators in a pull-mode to transfer the load of the hold-down rod assembly from the plurality of compression brackets to the corresponding plurality of actuators, the control circuit operates the plurality of actuators to move the respective cylinders to release the tension in the tension rods after transferring the load of the hold-down rod assembly to the plurality of actuators, wherein the control circuit removes gas from the top chamber of each respective cylinder to decrease gas pressure in the top chambers to release the tension in the tension rods.

14. The spacecraft deployment system of claim 13, wherein:

the control circuit routes the gas from the top chamber of each respective cylinder to the bottom chamber of each respective cylinder to decrease the gas pressure in the top chambers and increase gas pressure in the bottom chambers to release the tension in the tension rods.

15. The spacecraft deployment system of claim 13, wherein the control circuit is further configured to operate in the actuators in a push-mode to rotate the plurality of tension rods outward from the stack to permit deployment of the spacecraft after the release of the tension in the plurality of tension rods.

\* \* \* \* \*